A. R. SELDEN.
VEHICLE SPRING.
APPLICATION FILED AUG. 15, 1906.
987,833.
Patented Mar. 28, 1911.
3 SHEETS—SHEET 1.
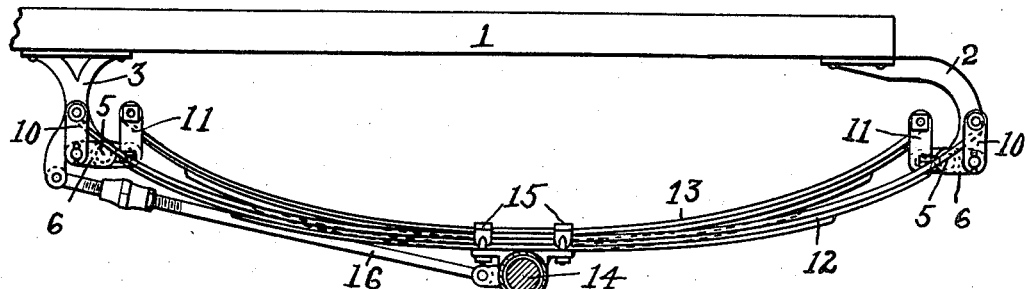
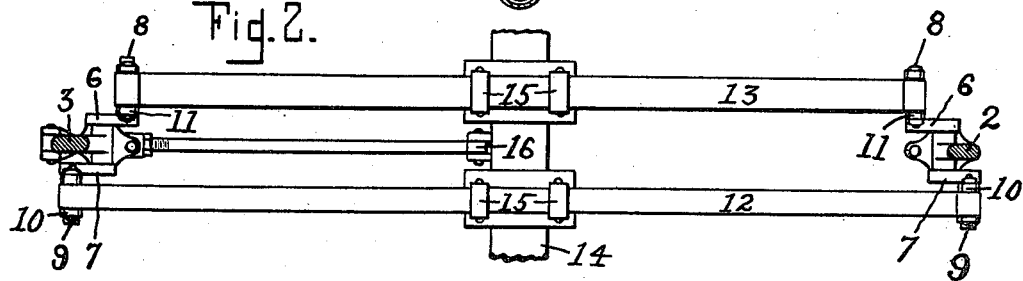
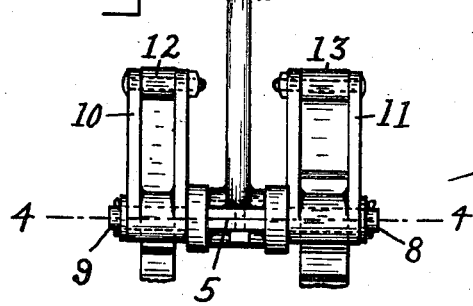
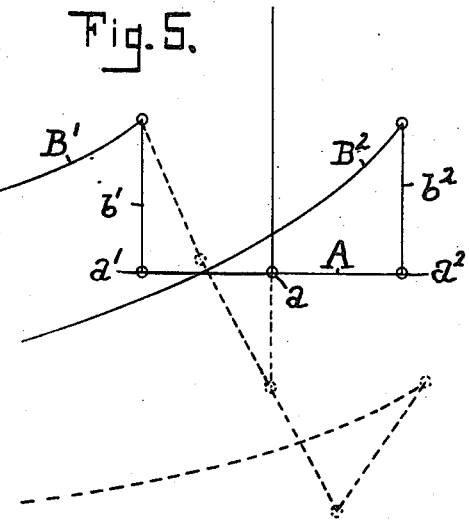
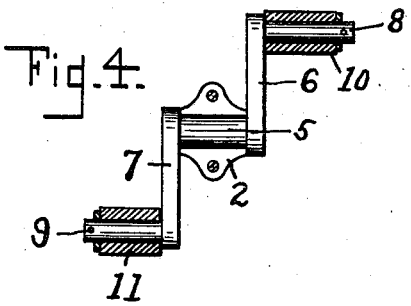
WITNESSES:
Clarence W. Carroll
L. Gurnee
INVENTOR
Arthur R. Selden A. R. SELDEN.
VEHICLE SPRING.
APPLICATION FILED AUG. 15, 1906.
987,833.
Patented Mar. 28, 1911.
3 SHEETS—SHEET 2.
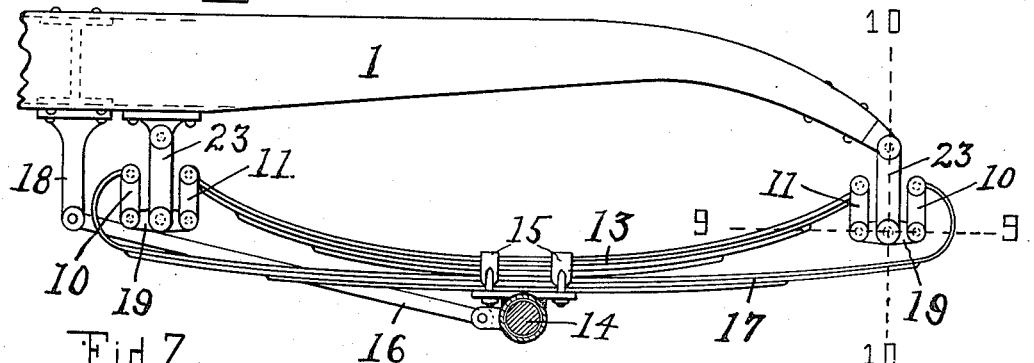
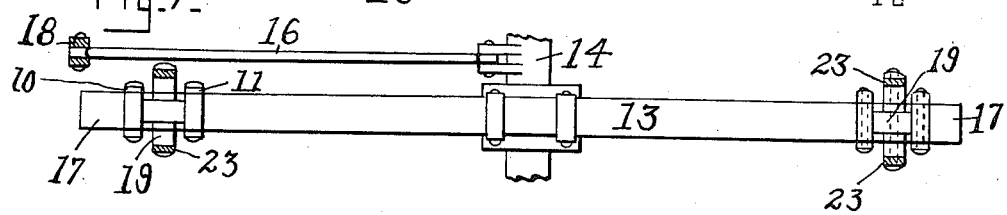
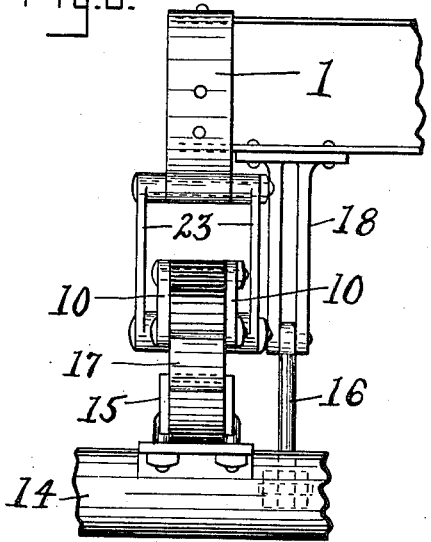
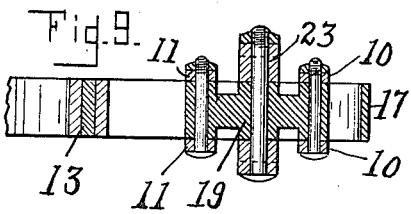
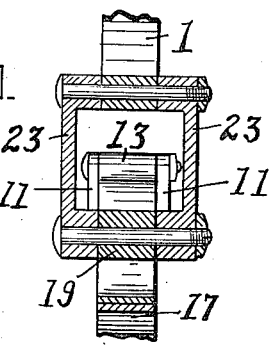
WITNESSES:
Clarence W. Carroll
D. Gurnee
INVENTOR
Arthur R. Selden

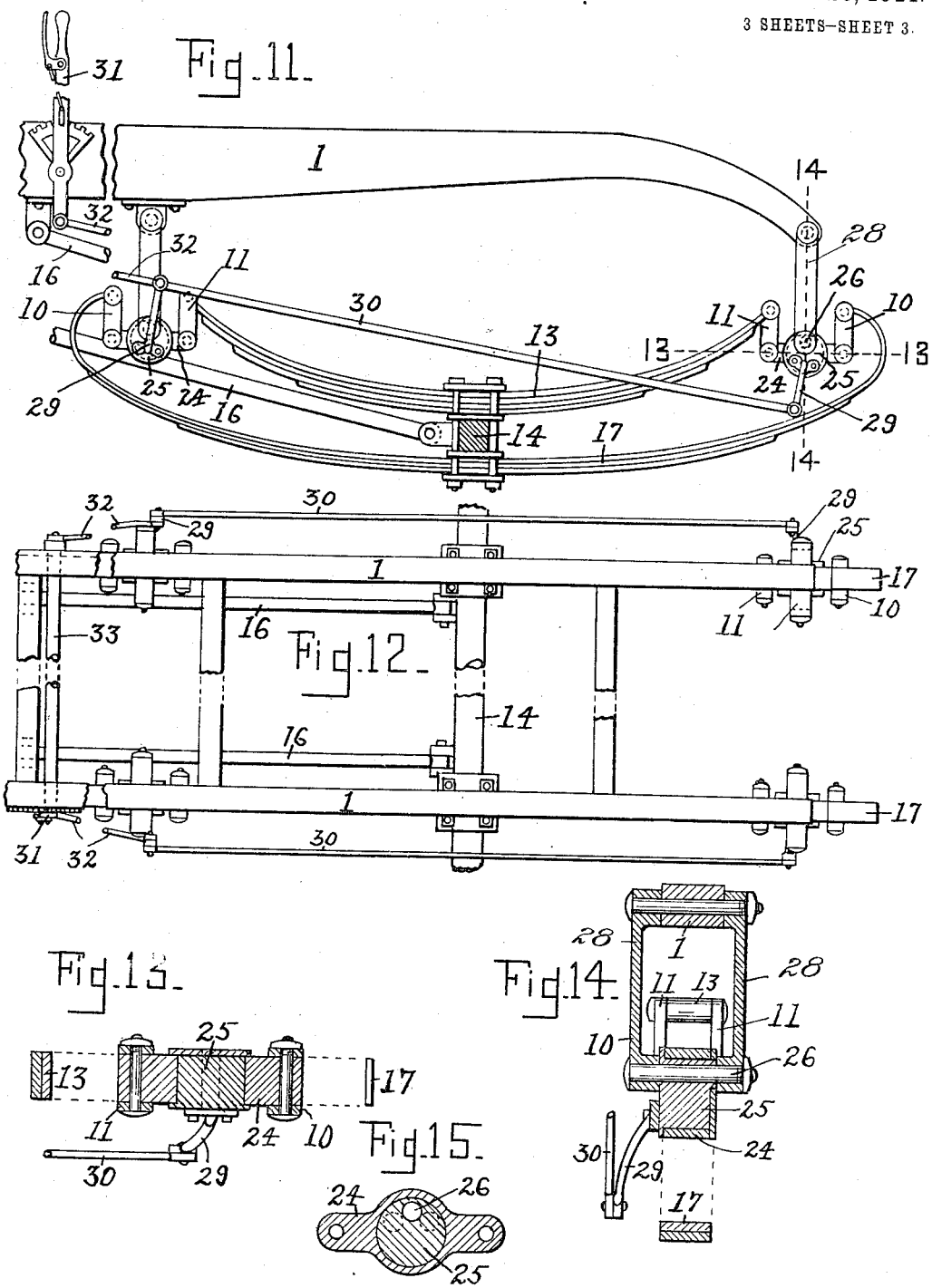

UNITED STATES PATENT OFFICE.

ARTHUR R. SELDEN, OF ROCHESTER, NEW YORK.

VEHICLE-SPRING.

987,833.  Specification of Letters Patent.  Patented Mar. 28, 1911.

Application filed August 15, 1906. Serial No. 330,738.

*To all whom it may concern:*

Be it known that I, ARTHUR R. SELDEN, a citizen of the United States, and resident of Rochester, in the county of Monroe and State of New York, have invented certain new and useful Improvements in Vehicle-Springs, of which the following is a specification.

This invention relates to vehicle springs. The object of the invention is to provide spring means for supporting a vehicle, whereby the lighter shocks are taken up principally by one spring, while heavier shocks are taken up by the first spring, and also by a second spring. The second spring may be stronger than the first spring, so that a shock may be resisted with greatly increasing force.

To this end the invention consists in the combination with two or more vehicle springs of connecting mechanism hereinafter described by which the springs are caused to operate in the manner just described.

In the drawings:—Figure 1 is a side elevation of a pair of springs and their appurtenances embodying my invention, the springs being fastened to the vehicle axle side by side; Fig. 2 is a plan view of the same pair of springs; Fig. 3 is an end view of the same pair of springs looked at from the right hand side thereof; Fig. 4 is a plan view of the equalizing or balancing lever at each end of a pair of springs; Fig. 5 is a diagram illustrating the action of the device; Fig. 6 is a side elevation of a pair of springs embodying this invention in which one spring is mounted upon another; Fig. 7 is a top plan view of the same structure; Fig. 8 is an end view of the same structure seen from the right hand side of Fig. 6; Fig. 9 is a cross section on the line 9—9 of Fig. 6; Fig. 10 is a vertical section on the line 10—10 of Fig. 6; Fig. 11 is a side elevation of an apparatus embodying this invention, in which one spring is fastened to the lower side of the axle, and the other spring is fastened to the upper side of the axle, and an adjusting device is used for changing the action of the equalizing and balancing lever; Fig. 12 is a plan view of the device embodying the same structure as that shown in Fig. 11, but showing two pairs of springs and a single apparatus for changing the equalizing or balancing lever; Fig. 13 is a section on the line 13—13 of Fig. 11; Fig. 14 is section on the line 14—14 of Fig. 11; and Fig. 15 is a central vertical section through the eccentric for changing the relative action of the spring through the equalizing or balancing lever.

Referring to Fig. 5, if a lever or balance bar A is pivotally supported at its center $a$ and its ends $a'$, $a^2$ are connected by links $b'$, $b^2$ with the ends of two springs $B'$, $B^2$, the following actions will occur:—The pivotal point $a$ of the balance bar or lever A, being attached to the fulcrum, may be considered as a stationary point. The shocks occurring from riding over rough points causes vertical movement of the axle, which is transmitted through the springs $B'$, $B^2$ to the upper ends of the links $b'$, $b^2$, which pull upward upon the ends $a'$, $a^2$ of the balance bar or lever. If the two springs $B'$, $B^2$ were equal in tension or strength, then a shock would be transmitted equally to the ends of the balance bar, and would be absorbed equally by the two springs, but if one spring, say $B^2$, is weaker than the other spring $B'$, then other actions will occur. It is of course clear that one spring may be made weaker than the other in its effect upon the end of the balance bar, either by having a different strength, or by having a different leverage. In this case of unequal springs, the spring $B'$ is to be considered as stronger in its effect than $B^2$. If the spring $B^2$ should bend to near its limit before the spring $B'$ commences to bend, we then have a position of the parts shown in dotted lines in Fig. 5, in which the balance bar or lever A is tipped, until it is in substantial alinement with the link $b'$, connecting it to the stronger spring $B'$. In this way, the weaker spring $B^2$ has been considerably compressed and has absorbed a large proportion of the shock before the spring $B'$ begins to take it up to an appreciable degree. It will be noted from the diagram that, on account of the toggle action at the end $a'$ of the balance bar or lever A, the pull upon the spring $B'$ becomes more and more direct and therefore increasingly powerful. It will be noted, further, that the travel of the end of the spring $B^2$ is considerably greater than the travel of the fulcrum point $a$, so that the spring $B^2$ has a long range of movement before it is fully compressed, and before a direct pull upon the stronger spring $B'$ begins to occur. Consequently, the action of the pair of springs through the balance bar permits a far greater range of movement of the springs than in case of a direct coupling; causes a smaller movement of the vehicle body, and opposes the last portion of the movement due to a shock with rapidly increasing resistance.

In Fig. 1, 1 is a vehicle body having suitable hangers, 2, 3, for supporting the balance bar and springs. At the lower ends of the hangers, 2, 3, is a bearing box carrying the pivot 5 of the balance bar. The balance bar is made in the form of two cranks lying in the same plane but any other arrangement of the bar may be employed that will produce a suitable balancing. In this case the center pivot 5 has connected to it two oppositely directed crank arms, 6, 7, at or near the ends of each of which are the pivot pins 8, 9. These pivot pins carry the lower ends of the links 10, 11, which at their other ends are pivoted to the ends of the springs 12 and 13. These springs are attached to the axle 14, by the spring clips 15. An adjustable distance-rod 16 is attached at one end to the axle 14, and at the other end to one of the hangers, as 3. This distance-rod may be adjustable in any suitable manner, but as here shown is of the turn buckle variety. The purpose of this rod is to maintain the relative position of the axle, with reference to the pivots 5. It will be seen that upon a vertical shock being applied to the axle 14, it will compress the two springs 12, and 13, but the spring 12 being less resistant than the other will bend, allowing the arm 6 to tilt downward and absorbing the shock until the toggle between the link 11 and the arm 7 approaches the straight line, when the pull upon the stronger spring 13 becomes direct and the stronger spring then takes up the remainder of the shock with all its resisting force. At this time the weaker spring 12 has already been compressed to a high degree, and during the remainder of its compression both springs resist the shock. In Fig. 6 the same parts are shown, except that the spring 12 is replaced by a spring 17 having C-shaped recurved ends. The distance-rod 16 is in this case attached to a separate piece 18 upon the vehicle body 1, and the spring 13 is superimposed upon the spring 17. The balance bar is shown most clearly in Fig. 9 as a slightly different form, and is a straight piece 19 having three holes through it for the pivots of the links 23, 10 and 11. The links 10 and 11 are connected to the ends of the springs 17 and 13, respectively, and the link 23 is attached to the vehicle body 1 in any suitable pivotal way.

In case in either of the forms of the device shown in the preceding figures there should be a change in one of the springs, it would become necessary, in order to produce the proper effect, to change the balance bar 6 or 19 in order that the leverage should be suitable for the relative spring actions. So, too, in setting up the device in the first place, it is important to be able to change the fulcrum point of the balance bar, in order that the two springs may be properly adjusted with reference to each other, and furthermore, in case of a change of load it might become necessary to throw less action upon the weak spring, and more action upon the strong spring, or vice versa. In Figs. 11 to 15 are shown means for accomplishing these results, which are in effect means for shifting the fulcrum point of the balance lever. The specific form of device is an eccentric set in balance bar and carrying the pivotal point of the supporting link or hanger, which eccentric is provided with means for rotating it, so that the pivotal point of said link or hanger may be shifted toward one end or the other of the balance bar and thus change its fulcrum. The device in other respects is substantially the same as that shown in Fig. 8. The spring 17 has C-shaped ends which are attached by means of links 10 to balance bars 24. The spring 17 in this case is fastened to the lower side of the axle 14. The other and stronger spring 13 is attached to the upper side of the axle, and its ends are connected by means of links 11 to the other ends of the balance bars. Through the middle of each balance bar passes the eccentric 25, Fig. 15, having an eccentrically placed pivot bearing, through which passes the pin 26 of the supporting link or hanger 28 that is pivotally attached in any suitable manner to the vehicle body 1. Any suitable means for turning and locking each eccentric may be employed, but in this case is shown a device which operates both eccentrics of a pair of springs simultaneously. To each eccentric is fastened an arm 29. The arms are set parallel, so that the arc of movement of each of the connecting means shall be equal, and inasmuch as the movements of the eccentrics must be opposite, in order to maintain the relations of the parts, one arm projects downward from one eccentric and the arm of the other eccentric projects upward. The arms 29 are connected by a link 30, which is actuated in any suitable way, such as by the quadrant lock lever 31 upon the vehicle and the link 32.

In some cases, it may be desirable to adjust the pairs of springs simultaneously on both sides of a vehicle, in which case the device shown in Fig. 12 may be employed. The shaft 33 operated by the lock lever 31 extends across the machine, and by means of the lock lever itself at one end and a corresponding crank at the other end, actuates duplicate links 32, which actuate the duplicate links 30 on the two sides of the device, through which the fulcrum points of the balance bars of the pairs of springs on opposite sides of the vehicle may be adjusted simultaneously.

In order to maintain the springs at their full efficiency, means are provided for preventing the tilting of the vehicle body with reference to the wheel carrier. In the form shown, this is the distance-rod 16. It will be obvious, however, that if one-half of the springs 12 or 13, or of the corresponding springs in the other figures, are dispensed with, and the distance-rod or its equivalent is employed, the remaining half of the springs will operate as above described.

The words "wheel carrier" apply to the axle 14, or to any other device which supports the wheels with reference to the vehicle body, and between which and the body the springs are interposed.

What I claim is:—

1. In a vehicle spring device, a vehicle body composing one part thereof, a wheel carrier composing another part thereof, means for preventing tilting and longitudinal movement of one of said parts with reference to the other, a link pivoted to and depending from one of said parts, a balance bar pivoted between its ends to the free end of said link, and a pair of springs attached to the other of said parts having one spring connected with the inner end of the balance bar and the other spring connected with the outer end of the balance bar.

2. In a vehicle spring device, a vehicle body composing one part thereof, a wheel carrier composing another part thereof, means for preventing tilting and longitudinal movement of one of said parts with reference to the other, two links pivoted to and depending from one of said parts, two balance bars, each pivoted between its ends to the free end of one of said links, and a pair of springs attached to the other of said parts and having the ends of one spring connected with the inner ends of the said balance bars and the ends of the other spring connected with the outer ends of said balance bars.

3. In a vehicle spring device, a vehicle body composing one part thereof, a wheel carrier composing another part thereof, means for preventing tilting and longitudinal movement of one of said parts with reference to the other, a link pivoted to and depending from one of said parts, a balance bar pivoted between its ends to the free end of said link, upwardly extending links pivoted to the inner and to the outer ends of said balance bar, and a pair of springs attached to the other of said parts and having one spring attached to the upper end of one of said links and the other spring attached to the upper end of the other of said links.

4. In a vehicle spring device, a vehicle body composing one part thereof, a wheel carrier composing another part thereof, means for preventing tilting and longitudinal movement of one of said parts with reference to the other, two links pivoted to and depending from one of said parts, two balance bars, each pivoted between its ends to the free end of one of said links, a pair of upwardly extending links pivoted to the ends of each of said balance bars, and a pair of springs attached to the other of said parts and having the ends of one spring attached to the upper ends of the links on the inner ends of the balance bars and the ends of the other spring attached to the upper ends of the links on the outer ends of said balance bar.

5. In a vehicle spring device, a vehicle body composing one part thereof, a wheel carrier composing another part thereof, means for preventing tilting and longitudinal movement of one of said parts with reference to the other, a link pivoted to and depending from one of said parts, a balance bar pivoted between its ends to the free end of said link, and a pair of springs attached to the other of said parts having one spring connected with the inner end of the balance bar and the other spring connected with the outer end of the balance bar, the spring connected to the inner end of said balance bar being shorter and stronger than the other spring.

6. In a vehicle spring device, a vehicle body composing one part thereof, a wheel carrier composing another part thereof, means for preventing tilting and longitudinal movement of one of said parts with reference to the other, two links pivoted to and depending from one of said parts, two balance bars, each pivoted between its ends to the free end of one of said links, and a pair of springs attached to the other of said parts and having the ends of one spring connected with the inner ends of the said balance bars and the ends of the other spring connected with the outer ends of said balance bars, the spring connected to the inner ends of said balance bars being shorter and stronger than the other spring.

7. In a vehicle spring device, a vehicle body composing one part thereof, a wheel carrier composing another part thereof, means for preventing tilting and longitudinal movement of one of said parts with reference to the other, a link pivoted to and depending from one of said parts, a balance bar pivoted between its ends to the free end of said link, upwardly extending links pivoted to the inner and to the outer ends of said balance bar, and a pair of springs attached to the other of said parts and having one spring attached to the upper end of one of said links and the other spring attached to the upper end of the other of said links, the spring connected to the inner end of said balance bar being shorter and stronger than the other spring.

8. In a vehicle spring device, a vehicle body composing one part thereof, a wheel carrier composing another part thereof, means for preventing tilting and longitudinal movement of one of said parts with reference to the other, two links pivoted to and depending from one of said parts, two balance bars, each pivoted between its ends to the free end of one of said links, a pair of upwardly extending links pivoted to the ends of each of said balance bars, and a pair of springs attached to the other of said parts and having the ends of one spring attached to the upper ends of the links on the inner ends of the balance bars and the ends of the other spring attached to the upper ends of the links on the outer ends of said balance bar, the spring connected to the inner ends of said balance bars being shorter and stronger than the other spring.

9. In a vehicle spring device, a vehicle body composing one part thereof, a wheel carrier composing another part thereof, a balance bar connected between its ends with one of said parts by means including a pivotal joint to permit the balance bar to rock, a pair of springs attached to the other of said parts having one spring attached to one end of the balance bar and the other spring attached to the other end of the balance bar, and means for shifting the pivotal points of the balance bar laterally to and from the center thereof.

10. In a vehicle spring device, a vehicle body composing one part thereof, a wheel carrier composing another part thereof, two balance bars connected between their ends with one of said parts by means including pivotal joints to permit the balance bars to rock, a pair of semi-elliptical springs attached to the other of said parts and having the ends of one spring attached to the ends of the two balance bars and the ends of the other spring attached to the other ends of the same balance bars, and means for shifting the pivotal points of the balance bars laterally to and from the center thereof.

11. In a vehicle spring device, a vehicle body composing one part thereof, a wheel carrier composing another part thereof, two balance bars connected between their ends with one of said parts by means including pivotal joints to permit the balance bars to rock, a pair of semi-elliptical springs attached to the other of said parts, two links connecting the ends of one spring to the ends of the two balance bars, two other links connecting the ends of the other spring to the other ends of the same balance bars, and means for shifting the pivotal points of the balance bars laterally to and from the center thereof.

12. In a vehicle spring device, a vehicle body composing one part thereof, a wheel carrier composing another part thereof, a balance bar connected between its ends with one of said parts by means including a pivotal joint to permit the balance bar to rock, a pair of springs attached to the other of said parts having one spring attached to one end of the balance bar and the other spring attached to the other end of the balance bar, and a pivot support movable to and from the center of said balance bar.

13. In a vehicle spring device, a vehicle body composing one part thereof, a wheel carrier composing another part thereof, two balance bars connected between their ends with one of said parts by means including pivotal joints to permit the balance bars to rock, a pair of semi-elliptical springs attached to the other of said parts and having the ends of one spring attached to the ends of the two balance bars and the ends of the other spring attached to the other ends of the same balance bars, and a pivot support movable to and from the center of said balance bars.

14. In a vehicle spring device, a vehicle body composing one part thereof, a wheel carrier composing another part thereof, two balance bars connected between their ends with one of said parts by means including pivotal joints to permit the balance bars to rock, a pair of semi-elliptical springs attached to the other of said parts, two links connecting the ends of one spring to the ends of the two balance bars, two other links connecting the ends of the other spring to the other ends of the same balance bars, and a pivot support movable to and from the center of said balance bars.

15. In a vehicle spring device, a vehicle body composing one part thereof, a wheel carrier composing another part thereof, means for preventing the tilting and longitudinal movement of one of said parts with reference to the other, a balance bar connected between its ends with one of said parts by means including a pivotal joint to permit the balance bar to rock, a pair of springs attached to the other of said parts having one spring attached to one end of the balance bar and the other spring attached to the other end of the balance bar, and an eccentric supporting said balance bar and bearing one part of the pivotal support thereof whereby rotation of the eccentric changes the position of the pivotal point of said bar.

16. In a vehicle spring device, a vehicle body comprising one part thereof, a wheel carrier composing another part thereof, means for preventing the longitudinal movement of one of said parts with reference to the other, two balance bars connected between their ends with one of said parts by means including pivotal joints to permit the balance bars to rock, a pair of semi-elliptical springs attached to the other of said parts and having the ends of one spring attached to the ends of the two balance bars and the ends of the other spring attached to the other ends of the same balance bars, and an eccentric supporting said balance bars and bearing one part of the pivotal support thereof whereby rotation of the eccentric changes the position of the pivotal point of said bars.

17. In a vehicle spring device, a vehicle body composing one part thereof, a wheel carrier composing another part thereof, means for preventing the longitudinal movement of one of said parts with reference to the other, two balance bars connected between their ends with one of said parts by means including pivotal joints to permit the balance bars to rock, a pair of semi-elliptical springs attached to the other of said parts, two links connecting the ends of one spring to the ends of the two balance bars, two other links connecting the ends of the other spring to the other ends of the same balance bars, and an eccentric supporting said balance bar and bearing one part of the pivotal support thereof whereby rotation of the eccentric changes the position of the pivotal point of said bars.

18. In a vehicle spring device, a vehicle body composing one part thereof, a wheel carrier composing another part thereof, means for preventing the tilting and longitudinal movement of one of said parts with reference to the other, a balance bar connected between its ends with one of said parts by means including a pivotal joint to permit the balance bar to rock, a pair of springs attached to the other of said parts having one spring attached to one end of the balance bar and the other spring attached to the other end of the balance bar, a pivot support movable to and from the center of said balance bar, and means for moving two of said pivot supports simultaneously toward and from the point of suspension of the springs.

19. In a vehicle spring device, a vehicle body composing one part thereof, a wheel carrier composing another part thereof, means for preventing the longitudinal movement of one of said parts with reference to the other, two balance bars connected between their ends with one of said parts by means including pivotal joints to permit the balance bars to rock, a pair of semi-elliptical springs attached to the other of said parts and having the ends of one spring attached to the ends of the two balance bars and the ends of the other spring attached to the other ends of the same balance bars, a pivot support movable to and from the center of said balance bar, and means for moving two of said pivot supports simultaneously toward and from the point of suspension of the springs.

20. In a vehicle spring device, a vehicle body composing one part thereof, a wheel carrier composing another part thereof, means for preventing the longitudinal movement of one of said parts with reference to the other, two balance bars connected between their ends with one of said parts by means including pivotal joints to permit the balance bars to rock, a pair of semi-elliptical springs attached to the other of said parts, two links connecting the ends of one spring to the ends of the two balance bars, two other links connecting the ends of the other spring to the other ends of the same balance bars, a pivot support movable to and from the center of said balance bars, and means for moving two of said pivot supports simultaneously toward and from the point of suspension of the springs.

21. In a vehicle spring device, a vehicle body composing one part thereof, a wheel carrier composing another part thereof, means for preventing the tilting and longitudinal movement of one of said parts with reference to the other, a balance bar connected between its ends with one of said parts by means including a pivotal joint to permit the balance bar to rock, a pair of springs attached to the other of said parts having one spring attached to one end of the balance bar and the other spring attached to the other end of the balance bar, an eccentric supporting said balance bar and bearing one part of the pivotal support whereby rotation of the eccentric changes the position of the pivotal point of said bar, and means for simultaneously rotating two of said eccentrics in opposite directions for moving said pivots correspondingly toward and from the suspension point of said springs.

22. In a vehicle spring device, a vehicle body composing one part thereof, a wheel carrier composing another part thereof, means for preventing the tilting of one of said parts with reference to the other, two balance bars connected between their ends with one of said parts by means including pivotal joints to permit the balance bars to rock, a pair of semi-elliptical springs attached to the other of said parts and having the ends of one spring attached to the ends of the two balance bars and the ends of the other spring attached to the other ends of the same balance bars, an eccentric supporting said balance bars and bearing one part of the pivotal support thereof whereby rotation of the eccentric changes the position of the pivotal point of said bars, and means for simultaneously rotating two of said eccentrics in opposite directions for moving said pivots correspondingly toward and from the suspension point of said springs.

23. In a vehicle spring device, a vehicle body composing one part thereof, a wheel carrier composing another part thereof, means for preventing the tilting of one of said parts with reference to the other, two balance bars connected between their ends with one of said parts by means including pivotal joints to permit the balance bars to rock, a pair of semi-elliptical springs attached to the other of said parts, two links connecting the ends of one spring to the ends of the two balance bars, two other links connecting the ends of the other spring to the other ends of the same balance bars, an eccentric supporting said balance bars and bearing one part of the pivotal support thereof whereby rotation of the eccentric changes the position of the pivotal point of said bar, and means for simultaneously rotating two of said eccentrics in opposite directions for moving said pivots correspondingly toward and from the suspension point of said springs.

24. In a vehicle spring device, a vehicle body composing one part thereof, a wheel carrier composing another part thereof, a balance bar connected between its ends with one of said parts by means including a pivotal joint to permit the balance bar to rock in substantially horizontal normal position, and a pair of springs attached to the other of said parts and having one spring connected with the inner end of the balance bar and the other spring connected with the outer end of the balance bar, the connections including a link to permit relative longitudinal movement between one of the springs and the balance bar.

25. In a vehicle spring device, a vehicle body composing one part thereof, a wheel carrier composing another part thereof, a link pivoted to and depending from one of said parts, a balance bar pivoted between its ends to the free end of said link, and a pair of springs attached to the other of said parts and having one spring connected with the inner end of the balance bar and the other spring connected with the outer end of the balance bar.

26. In a vehicle spring device, a vehicle body composing one part thereof, a wheel carrier composing another part thereof, a balance bar connected between its ends with one of said parts by means including a pivotal joint to permit the balance bar to rock, upwardly-extending links pivoted to the ends of said balance bar, and a pair of springs attached to the other of said parts and having one spring attached to the upper end of one of the links and the other spring attached to the upper end of the other link.

27. In a vehicle spring device, a vehicle body comprising one part thereof, a wheel carrier comprising another part thereof, a pair of springs interposed between said parts, a bar pivotally connected with the adjacent ends of the springs to connect the springs together with provision for relative movement thereof, and a link pivotally connected with the bar and with the body of the vehicle to connect said parts together with provision for relative movement of the springs and the body.

28. In a vehicle spring device, a vehicle body comprising one part thereof, a wheel carrier comprising another part thereof, a pair of springs interposed between said parts, connections between the adjacent ends of said springs, said connections being yielding to permit the springs to have relative longitudinal movement, and a link connecting said ends of the springs with the body of the vehicle so as to permit relative longitudinal movement of the springs and the body.

ARTHUR R. SELDEN.

Witnesses:
H. L. OSGOOD,
D. GURNEE.